(12) United States Patent
Beckman et al.

(10) Patent No.: US 7,739,978 B2
(45) Date of Patent: Jun. 22, 2010

(54) ROTATABLE SHAFT POSITION INDICATOR

(75) Inventors: Bryan A. Beckman, Wendell, MN (US); Wallace F. Stommes, Fergus Falls, MN (US)

(73) Assignee: Metso Automation USA Inc., Fergus Falls, MN (US)

( * ) Notice: Subject to any disclaimer, the term of this patent is extended or adjusted under 35 U.S.C. 154(b) by 243 days.

(21) Appl. No.: 11/857,171

(22) Filed: Sep. 18, 2007

(65) Prior Publication Data
US 2009/0071554 A1    Mar. 19, 2009

(51) Int. Cl.
F16K 37/00    (2006.01)
(52) U.S. Cl. .................. 116/277; 200/308; 200/336
(58) Field of Classification Search .......... 116/277, 116/DIG. 21; 137/556, 556.3; 200/308, 200/309, 336, 568, 574
See application file for complete search history.

(56) References Cited

U.S. PATENT DOCUMENTS

| 4,214,133 | A |   | 7/1980  | Wolford et al.   |         |
|-----------|---|---|---------|------------------|---------|
| 4,494,566 | A | * | 1/1985  | Sinclair et al.  | 137/556 |
| 4,620,061 | A | * | 10/1986 | Appleton         | 174/51  |
| 4,776,730 | A | * | 10/1988 | Nearen et al.    | 406/124 |
| 4,962,290 | A |   | 10/1990 | Nelson et al.    |         |
| 5,223,822 | A |   | 6/1993  | Stommes et al.   |         |
| 5,278,530 | A | * | 1/1994  | Zovath           | 335/17  |
| 5,332,878 | A | * | 7/1994  | Borst et al.     | 200/329 |
| 5,888,276 | A | * | 3/1999  | Price et al.     | 96/17   |
| 6,044,791 | A | * | 4/2000  | LaMarca et al.   | 116/277 |

FOREIGN PATENT DOCUMENTS

GB    2229254 A    9/1990

OTHER PUBLICATIONS

International Search Report and Written Opinion for International Application No. PCT/US2008/076377, 9 pages.

* cited by examiner

*Primary Examiner*—R. A. Smith
(74) *Attorney, Agent, or Firm*—James J. Paige; Nikolai & Mersereau, P.A.

(57) ABSTRACT

In some embodiments, a rotary shaft position indicating and display apparatus for use with a device having a rotatable shaft may include one or more of the following features: (a) a housing having a base with a cover secured to said base and defining a hollow sealed chamber, (b) an actuator shaft journaled for rotation in said base and extending through said base into said sealed chamber, (c) at least one electromechanical actuating element mounted on said actuator shaft, (d) a frusto-conical member having graphics information representative of said actuator shaft position viewable through a window area, (e) said cover having a frusto-conical base, (f) female threads on the interior of the frusto-conical base, and (g) male threads on the base housing to accept the female threads on the interior of the frusto-conical base.

19 Claims, 4 Drawing Sheets

ROTATABLE SHAFT POSITION INDICATOR

FIELD OF THE INVENTION

Embodiments of the present invention generally relate to rotatable shaft position indicator devices. Particularly, embodiments of the present invention relate to devices for providing signals indicative of the rotation position of a rotary shaft, such as the shaft on a flow control valve. More particularly, embodiments of the present invention relate to an enhanced explosion resistant design with enhanced grounding capability that is resistant to device failure.

BACKGROUND

A rotary shaft position indicating switch assembly can be mounted on a valve or a hydraulic or pneumatic valve actuator having a rotary shaft projecting therefrom whose position is to be telemetered to a remote location. A rotary shaft position switch can be used for telemetering the positioning of a rotatable shaft, such as on a flow control valve to a remote location for indicating whether that valve is opened or closed. Often times these rotary shaft position indicators need to be used within explosive atmospheres.

An explosive atmosphere can be a mixture of dangerous substances with air, under atmospheric conditions, in the form of gases, vapors, mist, or dust in which, after ignition has occurred, combustion spreads to the entire unburned mixture. Atmospheric conditions are commonly referred to as ambient temperatures and pressures. That is to say temperatures of −20° C. to 40° C. and pressures of 0.8 to 1.1 bar.

Many workplaces may contain or have activities that produce explosive or potentially explosive atmospheres. Examples include places where work activities create or release flammable gases or vapors, such as vehicle paint spraying, or in workplaces handling fine organic dusts such as grain flour or wood.

These explosive atmosphere areas must be protected from sources of ignition. Employers are often required to take action to assure the safety of their employees, such as requiring employees wear appropriate clothing that does not create the risk of an electrostatic discharge igniting the explosive atmosphere, e.g., anti-static footwear. The clothing provided depends on the level of risk identified in the risk assessment.

The employer must also insure that the equipment within the explosive atmosphere meets certain requirements such as the Potentially Explosive Atmospheres (ATEX) Directive 94/9/EC which provides the technical requirements to be applied to equipment intended for use in potentially explosive atmospheres. Preventing releases of dangerous substances, which can create explosive atmospheres, and preventing sources of ignition are two widely used ways of reducing the risk. The Dangerous Substances and Explosive Atmospheres Regulations 2002 (DSEAR) place duties on employers to eliminate or control the risks from explosive atmospheres in the workplace.

It would be desirable to have a rotatable shaft position indicator that can be used within an explosive environment or volatile atmosphere. As part of this desire, it would be nice to have a rotatable shaft position indicator that is thoroughly grounded to remove electrical potential. And, it would be desirable to have a rotatable shaft position indicator that can be used for extended periods of time without seizing up and needing repair or replacement.

SUMMARY OF THE INVENTION

In some embodiments, a rotary shaft position indicating and display apparatus for use with a device having a rotatable shaft may include one or more of the following features: (a) a housing having a base with a cover secured to said base and defining a hollow sealed chamber, (b) an actuator shaft journaled for rotation in said base and extending through said base into said sealed chamber, (c) at least one electromechanical actuating element mounted on said actuator shaft, (d) a frusto-conical member having graphics information representative of said actuator shaft position viewable through a window area, (e) said cover having a frusto-conical base, (f) female threads on the interior of the frusto-conical base, (g) male threads on the base housing to accept the female threads on the interior of the frusto-conical base, (h) an insert located on the housing base to electrically ground the rotary shaft position indicating and display apparatus, and (i) a bushing adjacent to the shaft.

In some embodiments, a rotary shaft position indicating switch assembly may include one or more of the following features: (a) a housing having a base with male threads removably coupled with a cover having female threads defining a hollow sealed chamber when the base and cover are coupled, (b) an actuator shaft journaled for rotation in the base and extending through the base into the sealed chamber, (c) at least one electromechanical actuating element mounted on said actuator shaft, (d) a terminal strip within the chamber electrically coupled to the at least one electromechanical actuating element, (e) a frusto-conical member having graphics information viewable through a window area, (f) an insert located within the base for electrical grounding, and (g) a bushing adjacent to the shaft.

In some embodiments, a rotary shaft position indicating switch assembly may include one or more of the following features: (a) a housing having a base with a cover secured to the base and defining a hollow sealed chamber, (b) an actuator shaft journaled for rotation in said base and extending through said base into said sealed chamber, (c) a bore formed in the base for housing the actuator shaft, (d) at least one electromechanical actuating element mounted on the actuator shaft, (e) at least one bushing located adjacent to the bore and the actuator shaft to assist with alignment of the actuator shaft, (f) a frusto-conical member secured to the base, having graphics information viewable through a window area, (g) the cover having a frusto-conical base, (h) male threads on the base housing to accept female threads on the interior of the frusto-conical base, and (i) an insert located on the housing base to electrically ground the rotary shaft position indicating assembly.

DESCRIPTION OF THE PREFERRED EMBODIMENT

Figure 1:
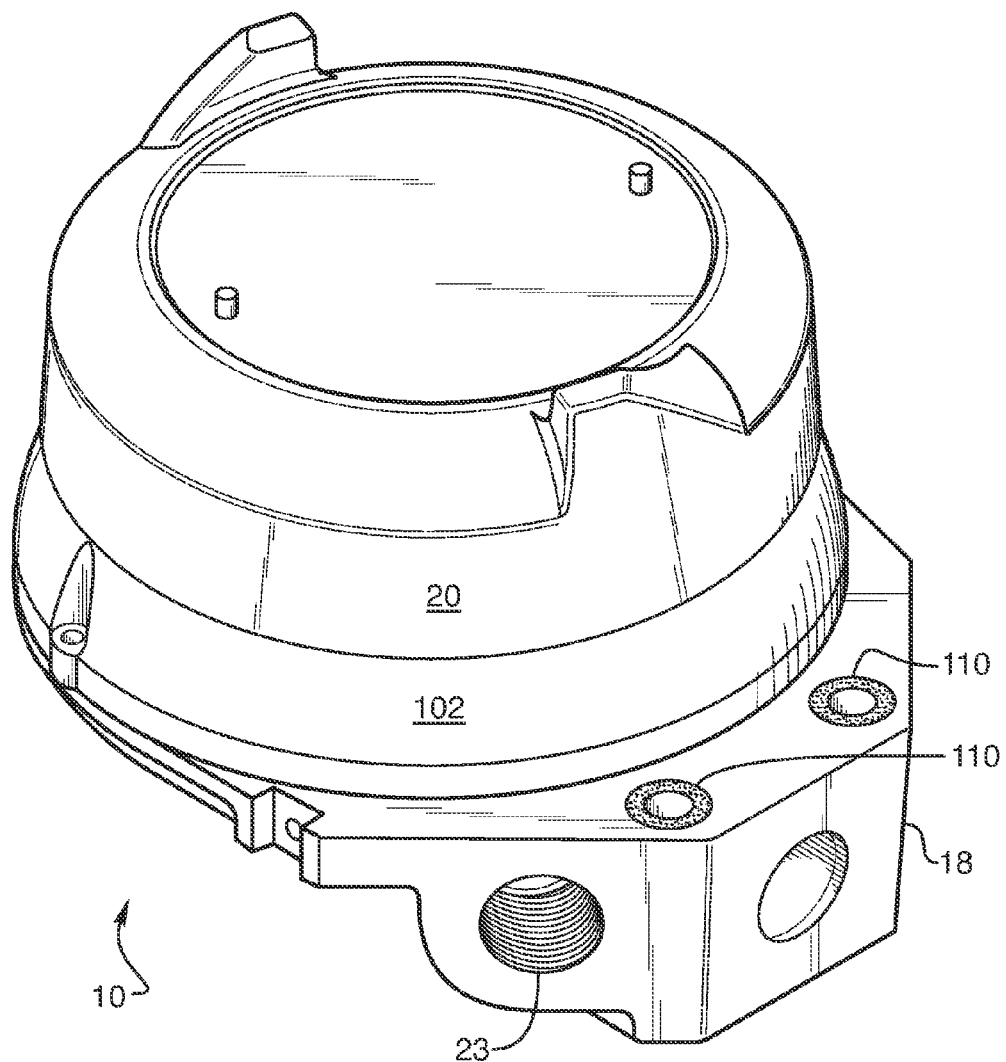
FIG. 1 shows a partial side elevation view of a rotatable shaft indicator and display device in embodiments of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Figure 2:
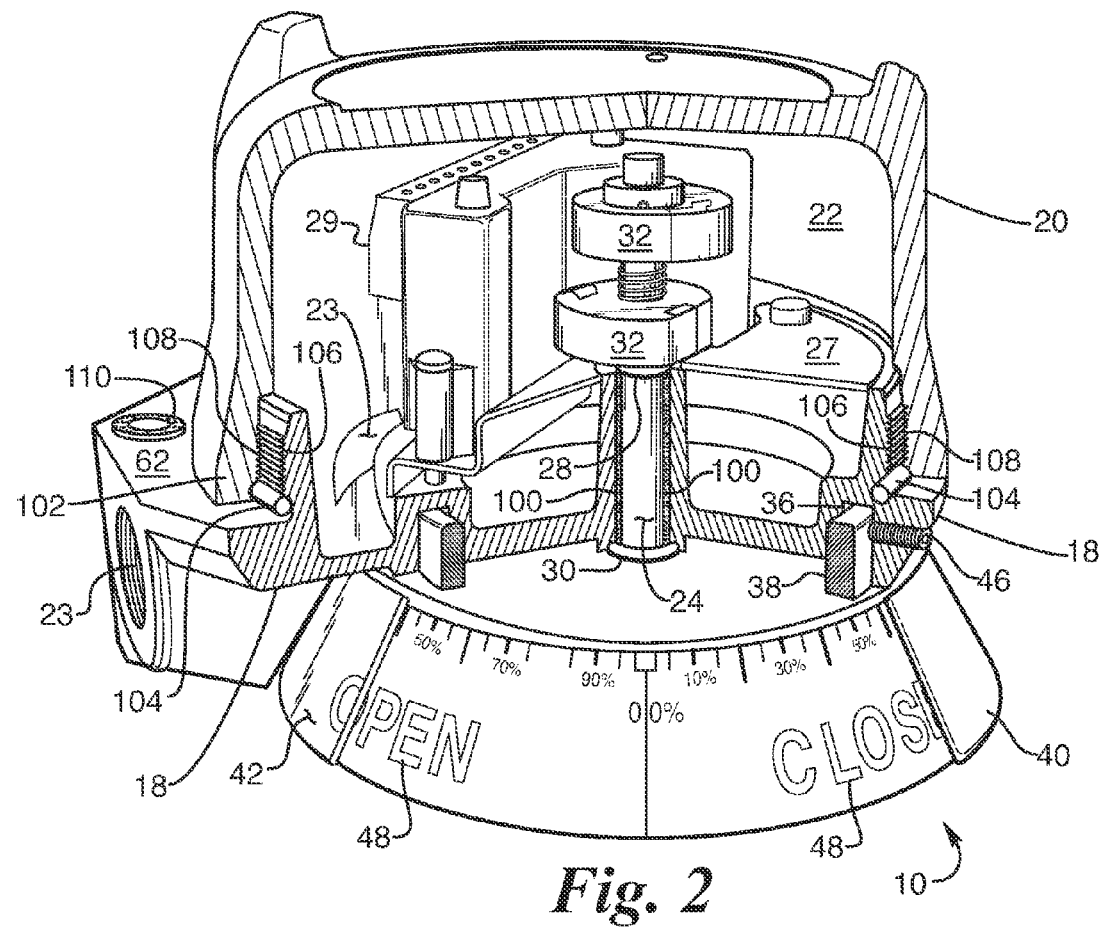
FIG. 2 shows a side cross-sectional view of a rotary shaft indicator and display in embodiments of the present invention.
Figure 3:
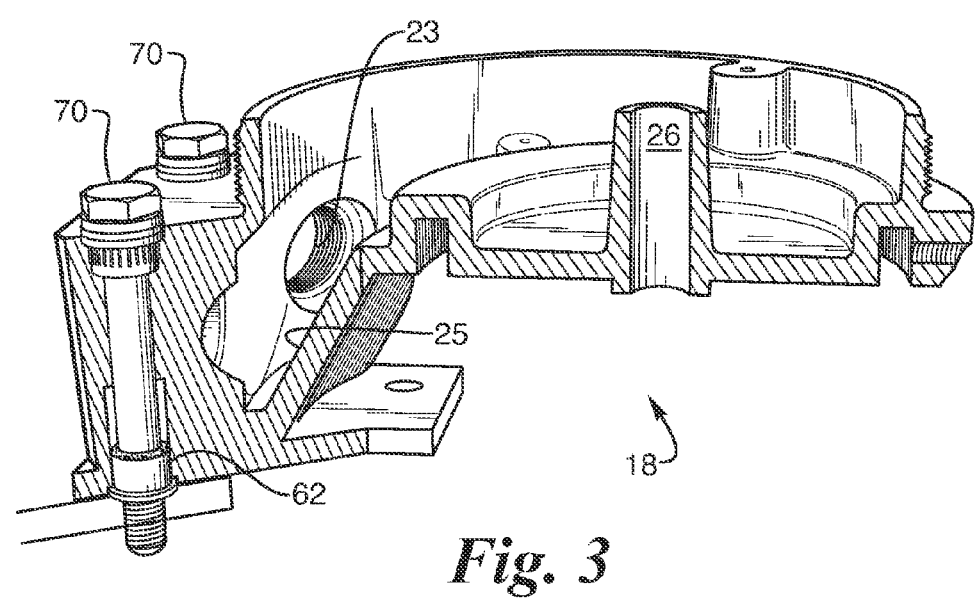
FIG. 3 shows a side cross-sectional view of a base element in embodiment of the present invention.
Figure 4:
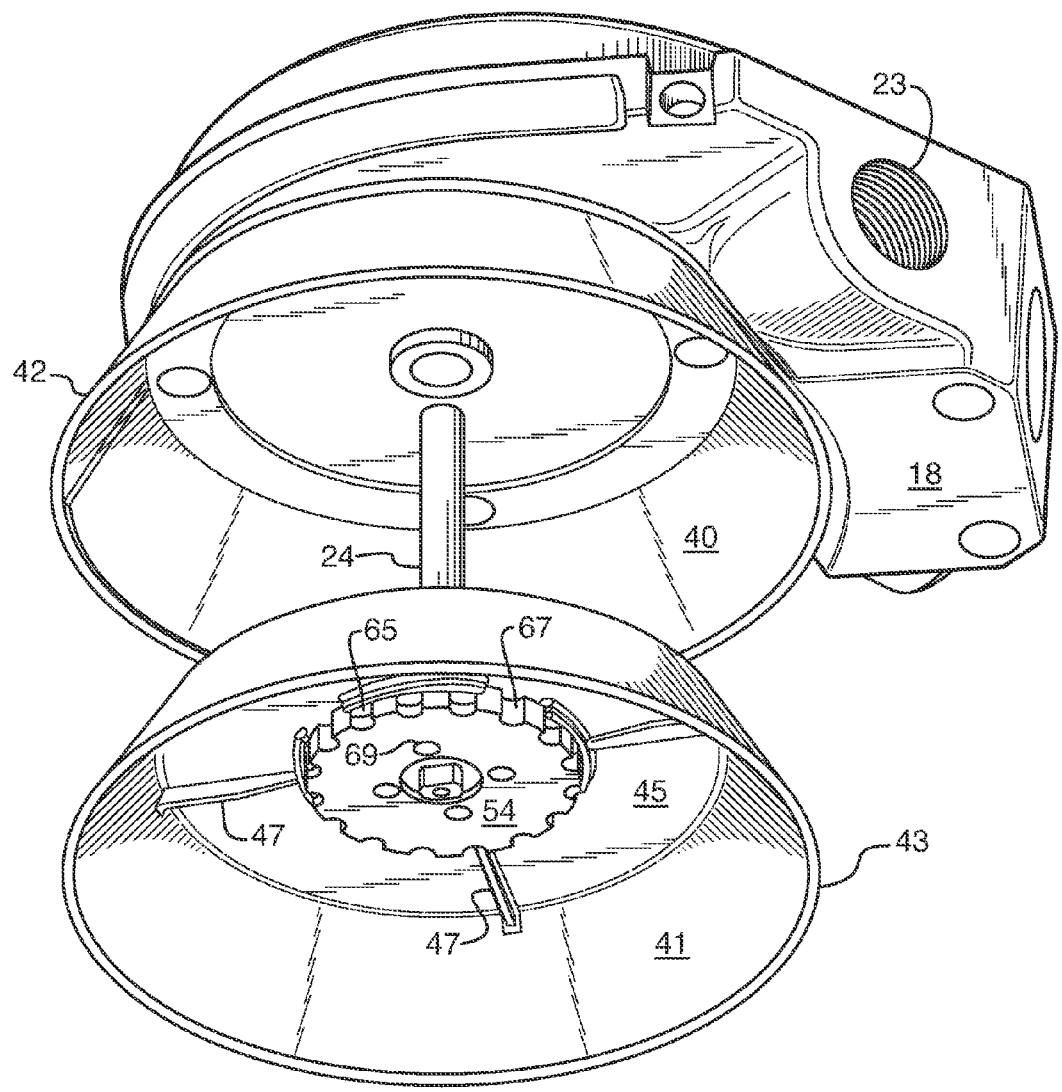
FIG. 4 shows an exploded view of a rotatable shaft indicator and display device in embodiments of the present invention.

With reference to FIGS. 1, 2, and 3, various views of a rotatable shaft indicator and display device in embodiments of the present invention are shown. A rotary shaft position indicating switch assembly 10 can be mounted on a valve or a hydraulic or pneumatic valve actuator (not shown) having a rotary shaft (not shown) projecting therefrom whose position is to be telemetered to a remote location. The valve actuator while generally cylindrical or irregular in shape is provided typically with a planar mounting surface.

Rotary shaft position indicating and switch assembly 10 can include a housing including base member 18, which can be molded from a suitable metal or plastic material, and a cover 20 affixed thereto. Base 18 and cover 20 define a hollow sealed chamber 22 (FIG. 2). Base 18 includes a threaded opening 23 for receiving a fitting (not shown) on the end of electric conduit in which wiring for switch assembly 10 passes. Base 18 further includes a ramp surface 25 forward of opening 23 which serves to feed the wires up toward a terminal strip 29 when the ends are pushed through opening 23.

As is further shown in FIG. 2, an actuator shaft member 24 is journaled for rotation in a bore 26 formed in base member 18. Actuator shaft 24 projects upwardly through a bottom plate member 27 into the interior of chamber 22 and O-rings, such as 28 and 30, provide a shaft seal preventing the ingress of dust or moisture into chamber 22. Shaft O-rings 28 and 30 help seal drive bushings 100 from both external corrosives and internal contaminants that would otherwise enter the enclosure. Further, O-rings 28 and 30 help retain drive bushing lubricant within the enclosure to assure smooth operation. Drive bushings 100 are discussed in more detail below.

Secured to actuator shaft 24 along its length are one or more electromechanical actuating elements which are designed to cooperate with a mating device for producing an electrical signal. For example, the actuator elements may be a cam, as at 32, which are adapted to engage the actuator arm (not shown) of corresponding proximity and snap action switches (not shown) mounted in stacked relation on bottom plate 27 within sealed chamber 22. Cams 32 are positioned such that as actuator shaft 24 rotates, different switches will be actuated at different points in the rotational travel of shaft 24, all as is well known in the art relating to rotary shaft position indicating devices of the type involved here. Cams 32 can have touch and tune switch settings that allow the user to make adjustments quickly without the use of tools.

In embodiments of the present invention, an annular groove 36 is formed in the undersurface of base member 18, groove 36 being concentric with actuator shaft 24. Annular groove 36 receives an annular cylindrical projection 38 formed integrally with an outer drum or cover 40. Drum 40 is frusto-conical in shape and, as such, is flared so as to project outwardly and downwardly relative to base member 18. Drum 40 can be formed from a suitable plastic and is generally opaque, save for one or more window areas formed thereon which are transparent, as indicated by numeral 42. Window area 42 can provide a view without restricting accessibility or adding to the space requirements. An O-ring can be fitted into a groove formed in cylindrical projection 38 to provide a seal between the frusto-conical member 40 and base 18. Furthermore, the angular position of window 42 of the drum 40 can be set relative to the base by first loosening a set screw 46, rotating drum 40 clockwise or counterclockwise, and then retightening set screw 46.

Disposed immediately below outer frusto-conical drum 40 is an inner drum 41 which also is frusto-conical in shape, having flared side walls 43 and a generally planar top surface 45 integrally formed therewith. Provided on the outer surface of the flared portion of inner drum 41 are words or other graphics 48, as can best be seen in FIG. 2. When these graphics are aligned with window 42 of outer drum 40, they become visible to a viewer. Thus, in the case of a valve, the words "OPEN" and "CLOSED" may be displayed to provide a person with an indication of the status of that particular valve at any given time. Graphics 48 can also be a continuous percentage or a three way indication without departing from the spirit of the invention.

Formed inwardly through top surface 45 of inner drum 41 are a series of circumferentially spaced projections 65. These projections 65 are intended to mate with a plurality of semicircles 67 in spacer member 54. Spacer member 54 is preferably molded from sintered stainless steel and is of a predetermined thickness dimension. It also includes a plurality of apertures 69 formed in the undersurface thereof so that further identical spacer members can be stacked by aligning the projections of one with the apertures of the other.

Inner drum 41 can be connected to a rotatable shaft with a Namur mount. A Namur mount is a semi-subplate mounting style that allows for rapid attachment as well as replacement. It is fully contemplated other means of attachment could be used without departing from the spirit of the invention. Tabs 47 could fit within a slot on a rotatable shaft thus connecting the rotatable shaft with switch assembly 10.

Figure 5:
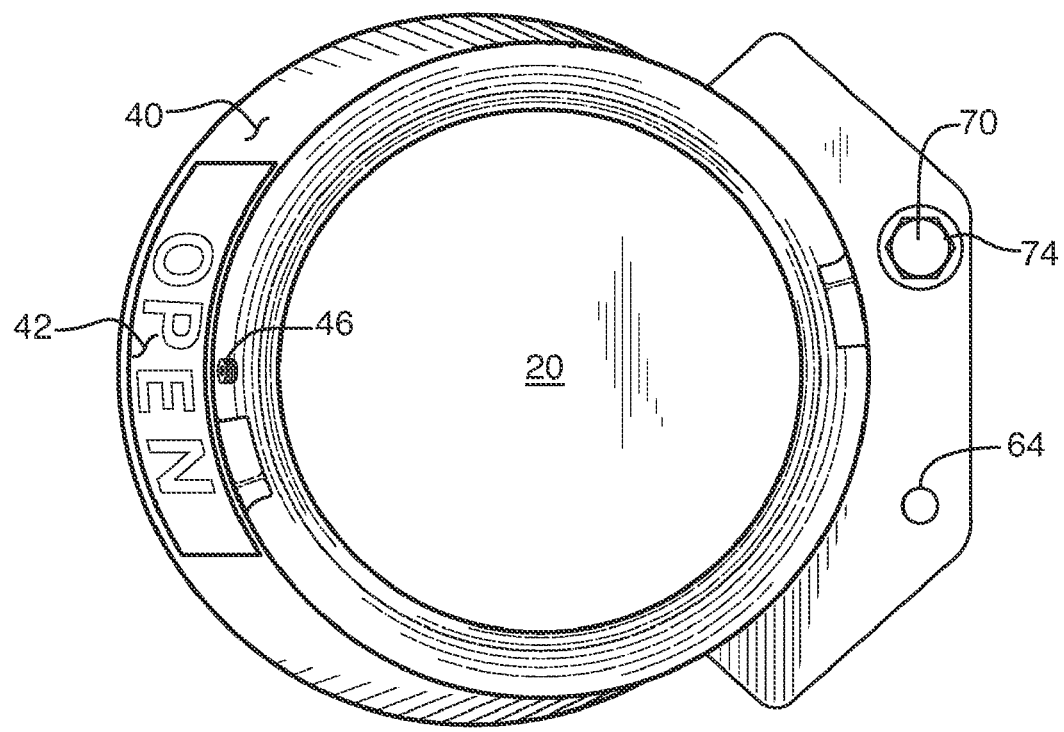
FIG. 5 shows a top view of a rotatable shaft indicator and display in embodiments of the present invention.

From the top view of FIG. 5, it can be seen that molded or machined cover 40 includes a pair of through-holes 64 extending through the thickness dimension thereof. In mounting rotary shaft position indicating and switch assembly 10 on a valve or valve actuator, a bracket is first fastened by bolts to the planar mounting surface of the valve with screw-type fasteners, as at 70, extending through appropriately spaced holes formed in a mounting bracket. To accommodate a variety of offsets and height differentials between the planar mounting surface and the shaft which may be encountered in the field, a series of further spacers can be stacked between the undersurface of rubber quad ring 62 of base 18 and the mounting bracket. Next, rotary shaft position indicating switch assembly 10 is held secure with bolts 70 turned through rubber quad ring 62 to hold the assembly in place to a mounting bracket (not shown).

With reference to FIG. 2, a side cross-sectional view of a rotary shaft indicator and display in embodiments of the present invention is shown. Cover 20 can be manufactured from aluminum, for explosion proof applications, or Lexan®, a highly durable polycarbonate resin thermoplastic intended to replace glass, for impact resistance applications. However, it is fully contemplated cover 20 could be made from most any material without departing from the spirit of the invention. Explosion resistant cover 20 has a frusto-conical cover base 102 that extends outward away from shaft member 24. Cover base 102 extends from a thickness of 0.188 inches to a thickness of 0.020 inches thus increasing the amount of material at cover base 102. Base 102 can range from a thickness of 0.376-0.094 inches at its thickest to 0.040-0.010 inches at its thinnest, however, most any dimensions are contemplated without departing from the spirit of the invention. It is this increase in material thickness, weight, and strength that assist in maintaining a secure connection between cover 20 and base 18 and also assists in keeping explosive atmosphere conditions out of sealed chamber 22. Further assisting in keeping explosive atmospheres out of sealed chamber 22 is O-ring 104 that assists in sealing the connection between cover 20 and base 18.

Base 18 is shown with male threads 106 that secure cover 20 to base 18 by cover 20 being turned clockwise upon base 18 thus engaging male threads 106 into female threads 108 located on the inside of cover base 102. Base 18 can have eight male threads to provide a secure attachment of cover 20 and to prevent explosive atmospheres from penetrating into sealed chamber 22. However, more than eight male threads 106 are fully contemplated without departing from the spirit of the invention. In fact, the inventors have found that embodiments of the present invention would function properly with only four mail threads 106 or cover 20 could be backed off half way (e.g., only four male threads holding cover 20 onto base 18) and still function properly. This is in direct contrast with standard display assembly.

Male and female threads 106 and 108 are general-purpose metric screw threads ("M" series threads) defined in international standard ISO 68-1. Each thread is characterized by its major diameter and its pitch. ISO metric threads consist of a symmetric V-shaped thread. In the plane of the thread axis, the flanks of the V have an angle of 60° to each other. The outermost ⅛ and the innermost ¼ of the height of the V-shape are cut off from the profile. In an external (male) thread (e.g., on a bolt), the major diameter and the minor diameter define maximum dimensions of the thread. This means that the external thread must end flat at the major diameter, but can be rounded out below the minor diameter. Conversely, in an internal (female) thread (e.g., in a nut), the major and minor diameters are minimum dimensions; therefore the thread profile must end flat at the minor diameter but may be rounded out beyond the major diameter. Metric threads 106 and 108 help provide a secure connection between cover 20 and base 18 and ensures sealed chamber 22 can cool and/or vent any gases within the chamber when they explode, thus preventing an ignition point for gases outside of the chamber.

Inserts 110 provide better grounding for switch assembly 10. A spark or an electrical potential are undesirable to have within an explosive atmosphere. Therefore it is desirable to thoroughly ground switch assembly 10. Electrical potentials can build on most any electrical device and the chance of electrical potential buildup increases when a device has a rotating element such as shaft 24. Therefore it is desirable to efficiently and effectively ground switch assembly 10. Inserts 110 help provide an effective ground for electrical potential. Inserts 110 effectively pass any electrical potential on switch assembly 10 from switch assembly 10 to a valve attached and then to ground. Thus insert 110 helps prevent any spark or electrical potential from causing an explosion in an explosive atmosphere. Insert 110 can be made of stainless steal; however, most any type of conductive material would be acceptable without departing from the spirit of the invention.

Seal drive bushing 100 helps prevent shaft 24 from seizing up (especially in a high rotation environment) and also assists in preventing any sparks or "hot points" created by the rotation of shaft 24. Seal drive bushing 100 is impregnated with oil, e.g., SAE 30W and surrounds shaft 24 within bore 26. Bushing 100 helps prevent any misalignment or any wear due to misalignment between switch assembly 10 and the valve it is attached to.

The impregnated oil within bushing 100 can act as an insulator to help disperse heat created by the rotation of shaft 24. Further, bushing 100 can also assist in dispersing heat created by the rotation of shaft 24. Bushing 100 is press fitted into bore 26. Bushing 100 can be made of bronze or brass; however, it is fully contemplated that bushing 100 can be made from most any material without departing from the spirit of the invention.

Thus, embodiments of the ROTATABLE SHAFT POSITION INDICATOR are disclosed. One skilled in the art will appreciate that the present teachings can be practiced with embodiments other than those disclosed. The disclosed embodiments are presented for purposes of illustration and not limitation, and the present teachings are limited only by the claims that follow.

What is claimed is:

1. A rotary shaft position indicating and display apparatus for use with a device having a rotatable shaft, comprising:
    (a) a housing having a base with a cover secured to said base and defining a hollow sealed chamber;
    (b) an actuator shaft journaled for rotation in said base and extending through said base into said sealed chamber;
    (c) at least one electromechanical actuating element mounted on said actuator shaft;
    (d) a frusto-conical member having graphics information representative of said actuator shaft position viewable through a window area; and
    (e) said cover having a frusto-conical base having a thickness greater than any other portion of the cover to ensure a secure connection between the base and the cover.

2. The rotary shaft position indicating and display apparatus as in claim 1, further comprising female threads on the interior of the frusto-conical base.

3. The rotary shaft position indicating and display apparatus as in claim 1, further comprising male threads on the base housing to accept female threads on the interior of the frusto-conical base.

4. The rotary shaft position indicating and display apparatus as in claim 1, further comprising an insert located on the housing base to electrically ground the rotary shaft position indicating and display apparatus.

5. The rotary shaft position indicating and display apparatus as in claim 1, further comprising a bushing adjacent to the shaft.

6. The rotary shaft position indicating and display apparatus as in claim 1, wherein the hollow sealed chamber can contain an explosion within the hollow sealed chamber.

7. The rotary shaft position indication and display apparatus as in claim 5, wherein the bushing within a bore is impregnated with oil.

8. A rotary shaft position indicating switch assembly, comprising:
    (a) a housing have a base with male threads, a cover having a base with female threads wherein the cover base has a thickness greater than any other portion of the cover to ensure a secure connection between the housing base and the cover base, said housing and said cover when coupled defining a hollow sealed chamber;

(b) an actuator shaft journaled for rotation in the housing base and extending through the housing base into the sealed chamber;

(c) at least one electromechanical actuating element mounted on said actuator shaft;

(d) a terminal strip within the chamber electrically coupled to the at least one electromechanical actuating element;

(e) a frusto-conical member having graphics information viewable through a window area; and (f) an insert located within the housing base for electrical grounding.

9. The rotary shaft position indicating switch assembly as in claim 8 wherein the cover base has a frusto-conical shape.

10. The rotary shaft position indicating switch assembly as in claim 8, wherein the male and female threads are metric.

11. The rotary shaft position indicating switch assembly as in claim 8, further comprising a bushing adjacent to the shaft.

12. The rotary shaft position indication switch assembly as in claim 11, wherein the bushing is impregnated with oil.

13. The rotary shaft position indicating switch assembly as in claim 8, wherein the hollow sealed chamber can contain an explosion within the hollow sealed chamber.

14. A rotary shaft position indicating assembly, comprising:

(a) a housing having a base, a cover having a base wherein the cover base has a thickness greater than any other portion of the cover to ensure a secure connection between the housing base and the cover base, said housing and said cover when coupled defining a hollow sealed chamber;

(b) an actuator shaft journaled for rotation in said housing base and extending through said housing base into said sealed chamber;

(c) a bore formed in the housing base for housing the actuator shaft;

(d) at least one electromechanical actuating element mounted on the actuator shaft;

(e) at least one bushing located adjacent to the bore and the actuator shaft to assist with alignment of the actuator shaft; and (f) a frusto-conical member secured to the housing base, having graphics information viewable through a window area.

15. The rotary shaft position indicating assembly as in claim 14, wherein the cover base has a frusto-conical shape.

16. The rotary shaft position indicating assembly as in claim 15, further comprising male threads on the housing base to accept female threads on the interior of the frusto-conical cover base.

17. The rotary shaft position indicating assembly as in claim 14, further comprising an insert located on the housing base to electrically ground the rotary shaft position indicating assembly.

18. The rotary shaft position indicating assembly as in claim 14, wherein the hollow sealed chamber can contain an explosion within the hollow sealed chamber.

19. The rotary shaft position indication assembly as in claim 14, wherein the bore has a bushing impregnated with oil within.

* * * * *